United States Patent
Gossweiler, III

(10) Patent No.: US 9,172,730 B2
(45) Date of Patent: *Oct. 27, 2015

(54) SOCIAL ASPECTS OF MEDIA GUIDES

(71) Applicant: Google Inc., Mountain View, CA (US)

(72) Inventor: Richard C. Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,718

(22) Filed: Jul. 7, 2014

(65) Prior Publication Data

US 2014/0325392 A1    Oct. 30, 2014

Related U.S. Application Data

(63) Continuation of application No. 12/938,810, filed on Nov. 3, 2010, now Pat. No. 8,776,121.

(51) Int. Cl.

| | |
|---|---|
| *G06F 3/00* | (2006.01) |
| *G06F 13/00* | (2006.01) |
| *H04N 5/445* | (2011.01) |
| *H04L 29/06* | (2006.01) |
| *G06Q 50/00* | (2012.01) |
| *H04N 21/472* | (2011.01) |
| *H04N 21/4788* | (2011.01) |
| *H04N 21/482* | (2011.01) |
| *H04N 21/488* | (2011.01) |
| *G06F 3/0484* | (2013.01) |

(52) U.S. Cl.
CPC .......... *H04L 65/403* (2013.01); *G06F 3/04842* (2013.01); *G06Q 50/01* (2013.01); *H04N 5/44543* (2013.01); *H04N 21/4788* (2013.01); *H04N 21/47214* (2013.01); *H04N 21/488* (2013.01); *H04N 21/4821* (2013.01)

(58) Field of Classification Search
USPC .............. 725/10, 32, 39–40, 44, 58; 715/751, 715/758; 709/204; 370/260
See application file for complete search history.

(56) References Cited

U.S. PATENT DOCUMENTS

| | | |
|---|---|---|
| 8,776,121 B2 | 7/2014 | Gossweiler, III |
| 2002/0112239 A1 | 8/2002 | Goldman |
| 2004/0114579 A1 | 6/2004 | Karaoguz et al. |
| 2004/0117853 A1* | 6/2004 | Karaoguz et al. ............. 725/134 |

(Continued)

FOREIGN PATENT DOCUMENTS

WO    2009/070193    6/2009

OTHER PUBLICATIONS

Authorized Officer L.W. Young. International Search Report and Written Opinion in International Application No. PCT/US2011/57993, dated Feb. 28, 2012, 12 pages.

(Continued)

*Primary Examiner* — Yassin Alata

(74) *Attorney, Agent, or Firm* — Fish & Richardson P.C.

(57) ABSTRACT

A computer-implemented method, including receiving, at a computing device, a request from a user to display descriptors of media programming content for a time period; identifying people associated with the user employing information stored in a computer database, and identifying time-associated media programs electronically scheduled on behalf of the identified people; and providing for display, to the user, the descriptions of the identified people and of the time-associated media programs.

20 Claims, 12 Drawing Sheets

(56) References Cited

U.S. PATENT DOCUMENTS

| | | |
|---|---|---|
| 2005/0210506 A1 | 9/2005 | Benliyan |
| 2005/0256754 A1 | 11/2005 | Nastacio |
| 2008/0022309 A1 | 1/2008 | Begeja et al. |
| 2008/0271080 A1 | 10/2008 | Gossweiler et al. |
| 2008/0276279 A1 | 11/2008 | Gossweiler et al. |
| 2009/0007179 A1* | 1/2009 | Angiolillo et al. ............. 725/44 |
| 2009/0037958 A1 | 2/2009 | Traw et al. |
| 2009/0113480 A1* | 4/2009 | Allard et al. ................... 725/46 |
| 2009/0271820 A1 | 10/2009 | Choi et al. |
| 2009/0293079 A1* | 11/2009 | McKee et al. ................... 725/10 |
| 2010/0175100 A1* | 7/2010 | Ogasawara ................... 725/114 |

OTHER PUBLICATIONS

Extended European Search Report issued in European Application No. 11838560.8 on Aug. 10, 2015, 9 pages.

* cited by examiner

FIG. 1B

SOCIAL ASPECTS OF MEDIA GUIDES

This application is a continuation of and claims priority under 35 U.S.C. §120 to U.S. application Ser. No. 12/938,810, filed on Nov. 3, 2010, which issued on Jul. 8, 2014, as U.S. Pat. No. 8,776,121, the entire contents of which are hereby incorporated by reference.

TECHNICAL FIELD

This document describes features relating to combining media-related programming, such as television scheduling, with social connections between people participating in the media-related programming.

BACKGROUND

People spend extended periods of time in front of various internet-connected devices—watching videos, chatting with friends, reading the news, and exchanging information in myriad other ways. One more recent development is the popularity of social networking web sites, where users may identify their friends, and may be connected by extension to their friends' friends, and so on, to create a complex social web. Such social web sites often allow users to see profiles on web pages created by their friends and to leave comments on their friends' web pages. In addition, users may use various message applications to keep in touch with their friends, such as instant messaging (IM) and text messaging.

SUMMARY

This document describes systems and techniques for integrating social connections into media planning, programming, and viewing or listening. In certain manners, the features described here permit a user to determine various media programs that members of their social circle are watching or are planning to watch or listen to. For example, an instant messaging client device may be updated to show media or related information for friends of a user of the client device, such as television programs that the friends are watching, or radio programs or podcasts to which the friends are listening. In a similar manner, an electronic program guide may be supplemented with information about personalized channels of friends of a user. The user may then be provided with tools for easily adding programming content from their friends' channels to their own personalize channels, or for easily switching to channels that their friends are watching so that they may have a shared media experience (e.g., to be discussed around the water cooler the next day, or by chat that same night).

In one example, a user may have a programming grid generated that shows their personalized channel along with their friends' personalized channels. Each personalized channel may be made up of programs that a user has scheduled to be played or recorded for them, or individual episodes that a user has placed in the personalized channel, such as by dragging an episode into a bar for the personalized channel from a bar for a broadcast channel in a program guide grid. The user may coordinate his or her personalized channel with those of his or her friends, such as by dragging programs from the friends' channels to their own personalized channel.

At some later time, the user may be watching his or her personalized channel, and may be provided with additional information about programming for their friends. For example, the user may be provided with an instant messaging or similar application that shows status information for their friends, such as whether their friends are available for communication and also any programs to which their friends are currently listening or watching, or for which the friends have a soon-to-occur appointment.

In this manner, consumption of media programming may be made a more social experience, and may be made more enjoyable for various users. This may provide users with various benefits, such as allowing them to develop more complete relationships with their friends, to expand their relationships to others, such as friends of their friends, and to more easily learn about new media programming options for which they might not otherwise have been aware. Such techniques may also benefit media providers, such as by making their programming available to additional viewers and listeners, and by ensuring that good programming succeeds by being more easily shared in a word-of-mouth manner. Advertisers may also benefit, in that more users will be watching the media and in turn watching their ads, and the connections between various users may be employed to better target ads and thus make ad spending more efficient. Information service providers, such as Google, may also benefit by providing such improved information to users, such as by generating additional advertising revenue and other revenue related to increases in use by the pleased users.

In one implementation, a computer-implemented method is disclosed that comprises receiving, at a computing device, a request from a user to display descriptors of media programming content for a time period; identifying people associated with the user employing information stored in a computer database, and identifying time-associated media programs electronically scheduled on behalf of the identified people; and providing for display, to the user, the descriptions of the identified people and of the time-associated media programs. The display can comprise a presentation of status of the identified people including current media viewing or listening status. Such a method can also comprise receiving a selection of an indicator of current media viewing or listening status for a first identified person and producing a command for matching the user's viewing or listening status to the viewing or listening status for the first identified person. Also, the presentation of status can be visually superimposed on a playing media program.

In some aspects, the display comprises a presentation of an electronic program guide containing personalized channels for one or more of the identified people, and the personalized channels can be displayed in combination with non-personalized broadcast channels in a grid. The method can also include receiving a request to copy a program from a personalized channel for a first identified person to a personalized channel for the user. In addition, the method can include receiving a request identifying a selected media program and generating a document that includes comments on the selected media program from the identified people. The people in the method can be identified from a list of friends predetermined by the user. In yet further aspects, the method can include querying a social networking server with an identifier for the user and obtaining in return the list of friends. The people can be identified from a list of groups predetermined by the user, and the method can further comprise receiving a request from the user to schedule a media program from one of the identified people, and providing a notice to the one of the identified people of the request. Moreover, the method can include coordinating communications between the user and one or more of the identified people while a common media program is played to the user and the one or more of the identified people.

In another implementation, a computer-implemented system is disclosed that comprises an interface to receive requests for the provision of media programming content for a time period; a processor programmed to identify individuals socially connected to a user; and a grid generator to generate code for displaying media programming for the individuals for the time period. The processor can be programmed to identify individuals socially connected to the user by submitted an identifier for the user to a general social networking system. The system can also comprise code for displaying the media programming presents current or scheduled programming for a plurality of identified individuals for display to the user. Also, the grid generator can be programmed to create a list of identified individuals currently receiving media programming, or to create a multi-dimensional grid showing personalized channels for the identified individuals. The system can additionally comprise a channel changing module to match a played media program for the user to a played media program from an identified individual that is selected by the user.

In another implementation, a computer-implemented system is described that comprises an interface to receive requests for the provision of media programming content for a time period; a processor programmed to identify individuals socially connected to a user; and means for providing for a display of media programming for the individuals for the time period.

The details of one or more embodiments are set forth in the accompanying drawings and the description below. Other features, objects, and advantages will be apparent from the description and drawings, and from the claims.

DESCRIPTION OF DRAWINGS

FIG. 1B shows an example screen shot of an electronic program guide with social status indicators.

Like reference symbols in the various drawings indicate like elements.

DETAILED DESCRIPTION

Figure 1A:
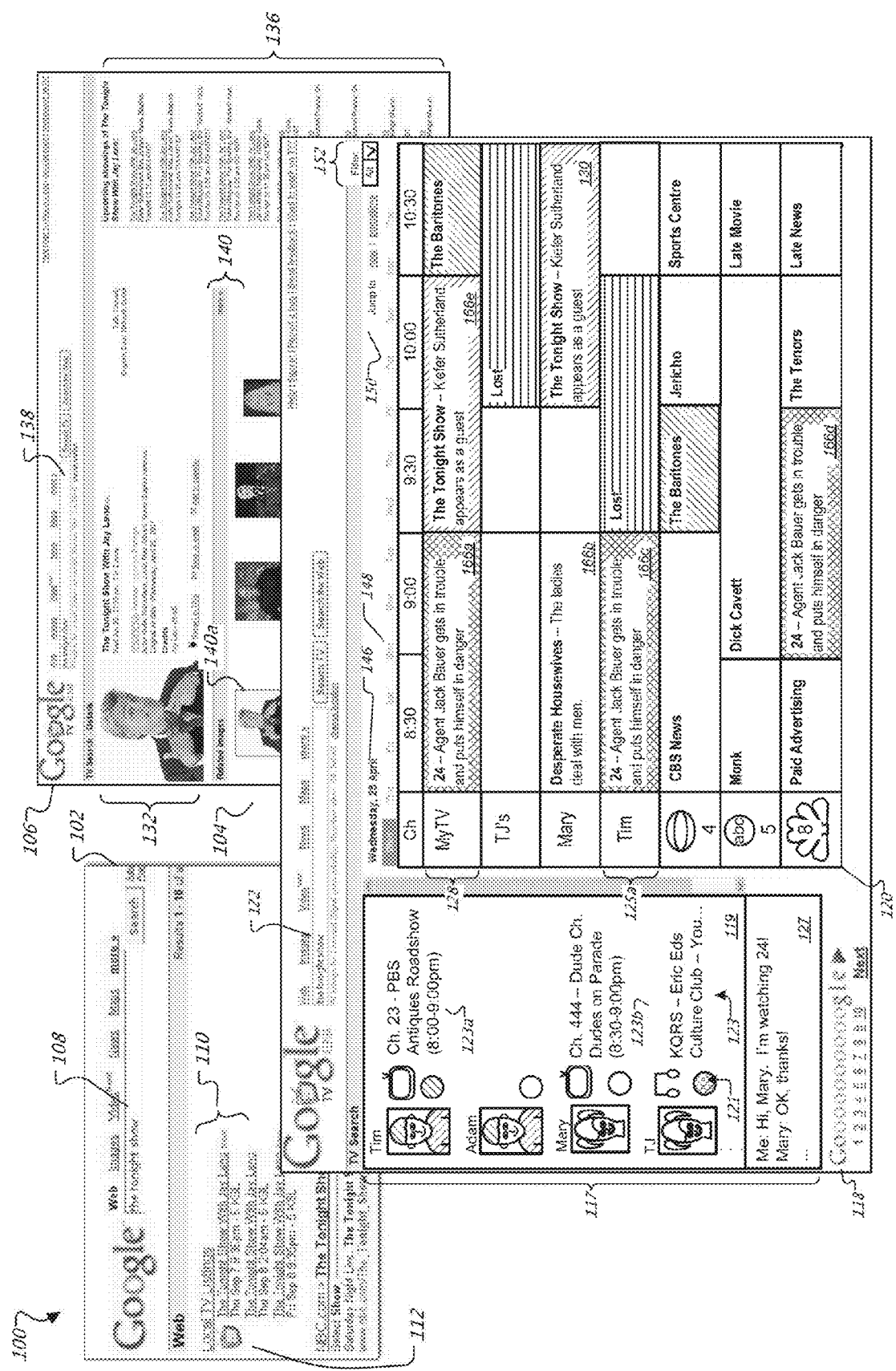
FIG. 1A shows displays illustrating interactions provided by an example program guide system.
Figure 1B:
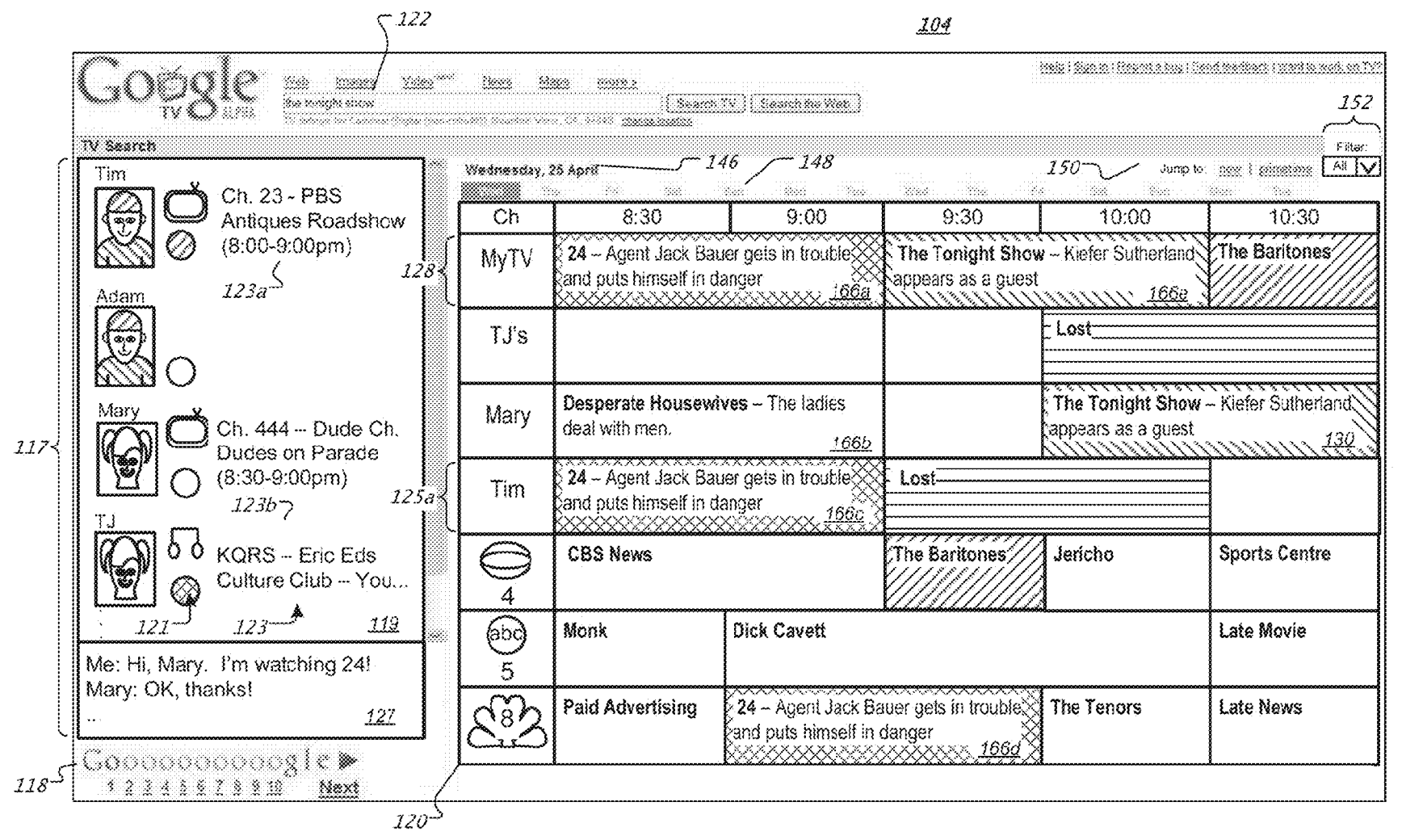
Figure 1C:
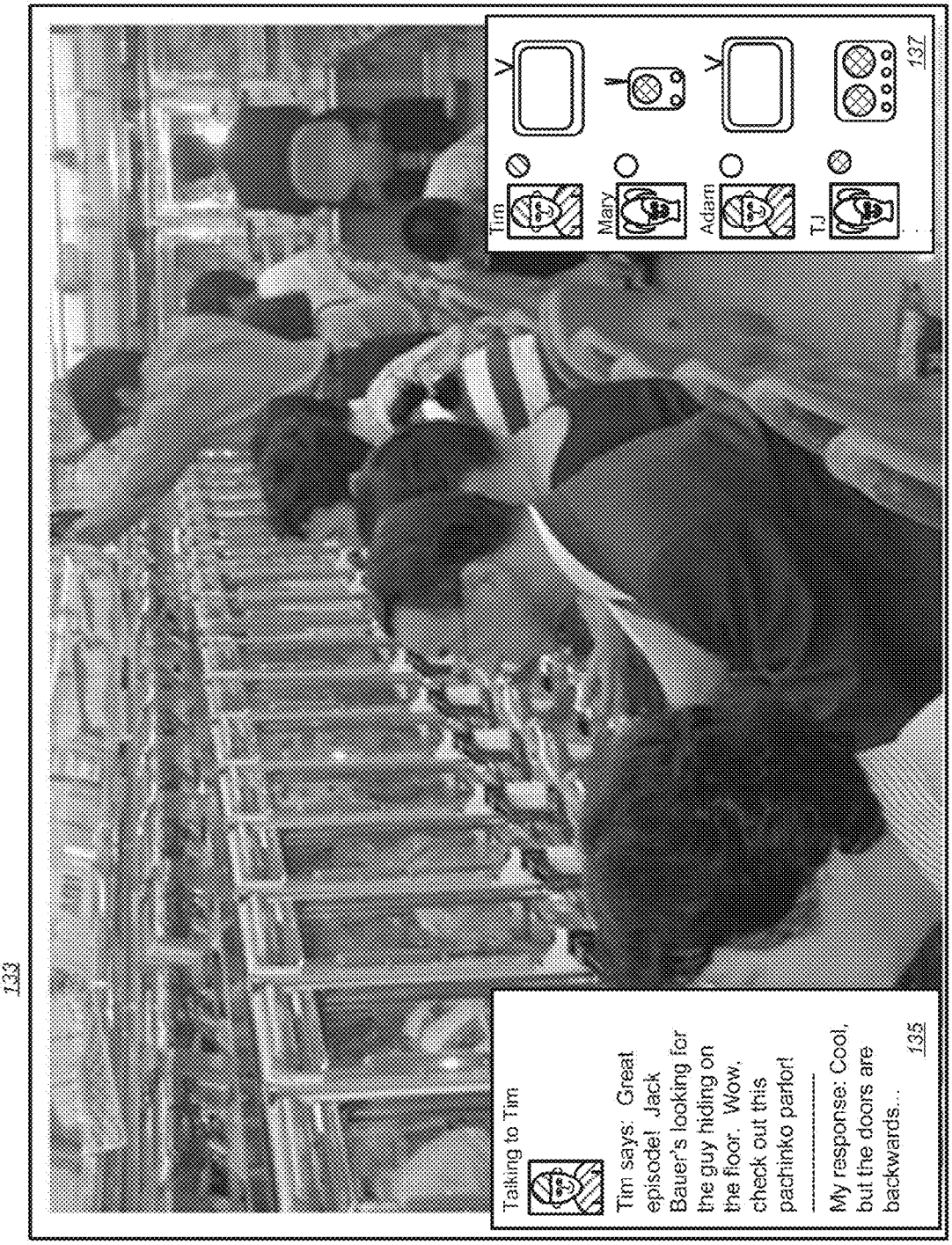
FIG. 1C shows a screen shot of a playing program combined with a chat session and on-screen promotion.
Figure 1D:
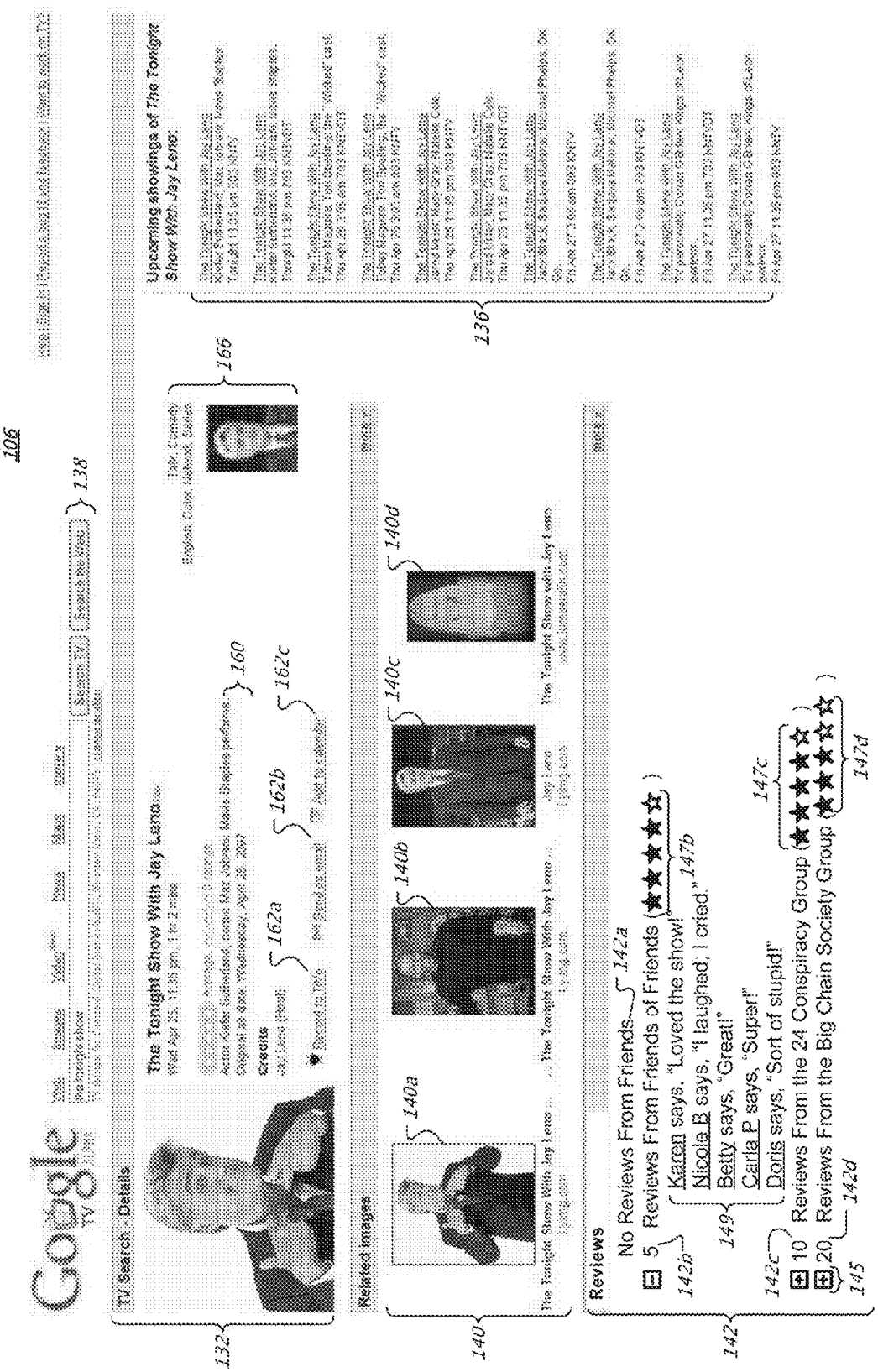
FIG. 1D shows an example screen shot of a media details page.

FIG. 1A shows displays illustrating interactions provided by an example program guide system 100, and FIGS. 1B and 1D show particular displays from FIG. 1A but in more detail. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

Along with locating general programming with system 100, such as by using search features, a user may also coordinate his or her programming with programming of other users in the first user's social circle. As shown in the figures, for example, and as explained in more detail below, the system 100 may identify people or groups in a user's social circle such as by making a request to an external system, and may then identify media-related information for those other users such as shows that the other users are currently watching and shows that the other users have schedule to watch or record, or have already recorded for future watching.

To share the media programming experience with friends and family, the user may use a social networking area 117. As depicted in FIG. 1A, the social networking area 117 is, in this example, a messaging window in which the user is instant messaging with one or more other users. Other types of social networking interfaces can also be used in the social networking area 117, such as video conferencing or other person-on-person interfaces. Using the social networking area 117, such as an instant messaging type of client application, applet or plug-in, the user can be communicating with others while enjoying media programming or while scheduling such programming, and can also quickly determine media that the other users are watching or listening to.

For example, the user may use the social networking area 117 to interact and network with other people in the user's social circle. Such social networking circles may include the user's friends, friends of the user's friends, and groups to which the user belongs as a member. Groups may be set up by various websites, allowing users to join the groups and opt in to group activities, such as text messaging or other communications.

The groups may link back to one or more social networking sites that keep track of relationships between various users on behalf of the websites and the program guide system 100. For example, the Home and Garden Channel may have a woodworking group. People may choose to join that group by selecting an appropriate icon on the Home and Garden Channel web site, and the channel may report such interest back to a social networking site such as FACEBOOK or ORKUT. That social networking site may then serve as a clearinghouse for all sorts of social interactions across different applications, including the program guide system 100. In the Home and Garden channel example, the members of the woodworking group may be provided with various custom messages, but may also be shown a personalized woodworking channel for the group. In this way they may either watch that channel (e.g., including shows drawn from various television channels such as PBS, the Home and Garden channel, etc.), or they may incorporate programs from that channel into their own personalized channel. Using the other social features discussed here, the users may then chat amongst themselves, coffee talk style, during the playing of a program, such as to share tips on particular ways for performing woodworking steps, or to criticize Norm the master carpenter, or to do other similar things. Such interaction may occur via an interface such as that shown by social networking area 117.

Where a user conducts searching activity on media-related information, they may enter it into a search box 108 on a main search screen, or may enter it into a search box 122 on a media-related page. When the request is entered on a general page, the request may be determined to be media-related (e.g., by comparing it to a white list of media-related terms) and the search results can include a list of one or more collections of programs related to the search request—grouped by episodes of a program. An episode as used here can include a particular showing in a series of showings (such as an episode of a sitcom), or may include a single episode of a program (such as a movie or a discrete on-line video). If a user is on a media-related page such as landing page 104 or chooses to go from a general search result page to a media-related page, the search results can also include a program schedule grid 120 that displays a grouping of channels and program episodes presented by each of the channels for a particular time period. The schedule grid may be positioned so as to show a "best" match for a submitted search term, or simply to show the grid adjusted to the current time.

In more detail, the general search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as opposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in specially-formatted one boxes. An additional results control 118 allows a user to navigate to other groupings that are not currently displayed, and that may be groupings considered to be less responsive to the user's request.

The program guide system 100 may present a landing page 104 in response to the user's selection of an item in the list 110. The landing page 104 includes the social networking area 117. The social networking area 117 displays one or more contacts in a contacts area 119. Each contact displayed can include the name of the contact (e.g., Tim, Mary, etc.), a photograph or other graphic depiction of the contact, an indicator 121, and a media symbol and description 123. The indicator 121, for example, may be a certain color (e.g., green, yellow, or red) or otherwise shaded to indicate that the contact is currently connected and available for communication.

The indicator 121 may also, in certain instances, indicated what the user is doing with respect to various media devices. For example, different colors or shading may indicate that the user is listening to a personal music library, listening to an Internet radio station, watching a recorded or real time television broadcast, or watching a video clip on YouTube. In some implementations, the indicator 121 may indicate the availability of the contact (e.g., green=available, red=away, etc.).

The media symbol and description 123 displayed for each contact may represent the type of media being enjoyed by the contact. Specifically, the media symbol may show a television or headphones to indicate that a contact is watching television programming or listening to music, and the description may describe the content of the currently programming being enjoyed by the contact.

In some implementations, the media symbol and description 123 may be a clickable link that automatically allows the user to begin viewing (or listening to) the contact's current media program. The user may click on the media symbol and description 123, to switch their media display device to match that of the contact. In addition, the user may click on the name of the contact or the graphic depiction of the contact to start a chat session with them, or otherwise communicate with them. In this way, the user can opt into whatever activity their friends are doing, and then have discussions with their friends, such as by using instant messaging or audio chat.

The program guide system 100 can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 can be displayed adjacent to and side-by-side with the social networking area 117. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110.

In some implementations, the location control 122 may control the geographical subset of contacts to which the user may want to communicate. For example, if the user travels frequently, the user may have different sets of friends on the East Coast and the West Coast. Where the user is a user registered with the program guide system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. As mentioned above, when a search is performed, the grid 120 may default to the area surrounding the time and channel of the episode determined to be a best search result. Selection of other entries or episodes referenced in the social networking area 117 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The personalized "My TV" channel 128 includes controls that allow a user to create a virtual channel using content from actual channels or another personalized channel, such as the personalized channel of another user. Episodes or programs may be added to the personalized channel 128 in a variety of ways. For example, a user may select a program in the schedule grid 120, and may select a command to move it to the personalized channel 128 or may drag it to the personalized channel, among other things. The personalized channel 128 is presented near the top of the grid 120 and slightly separated from actual channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time slots so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner. The program guide system 100 may alert the user when a program is about to air.

Also, one user may send a message to another user that identifies a particular program, such as by supplying a URL to an online video, supplying an episode ID number, providing the Transport Stream Identifier (TSID) that is unique to each televised program, or through another accepted mechanism. In addition, the user may select a control such as the "Add to my TV" control, where that control is associated with a program or episode, so as to add a show received via a message to their personalized channel 128.

Media programs that correspond to the contacts are included as rows in the schedule grid 120—a representation to a user of the personalized channels of members in their social circle. For example, Tim's programs are listed on Tim's channel 125*a*. In this way, the user can see in the schedule grid 120 media programs selected by Tim and other contacts. This can allow the user to compare the user's media programming selections with those of friends such as Tim. At the same time, the user can multi-task and conduct a messaging conversation with a selected contact. For example, as depicted in a message area 127, the user is conversing with Mary, discussing the television series (and current media programming selection) "24" displayed in cell 166*a*. As a result, Mary may stop watching the dude channel and switch to the user's show "24," or the user may select an icon near Mary to watch the Dude Channel with her. A similar message sent to TJ may prompt TJ to switch from listening to music (e.g., a pod cast, as depicted by headphones 123*b*) and begin watching "24."

In addition to adding programs from broadcast channels to personalized channel 128, the user may also add programs from their friends' personalized channels in a similar manner, so that they can schedule future session in which they and their friends watch similar programs. The personalized channels may also be organized by a group or organization rather than a friend. For example, the World Wildlife Fund (WWF) may sponsor a personalized channel, and users may subscribe to have that channel displayed with their program guide. The WWF may then select programs from multiple real-world channels such as the Discovery Channel and the Outdoor Network, among others, to establish programming that is more directed to particular WWF enthusiasts. In this manner, programming decisions may be more closely targeted for users, but may still be made automatically for the user and with a degree of expertise and professionalism. Likewise, certain people may become known as excellent programmers, and may build a following of people who want to see their channel displayed for watching.

The personalized channel 128 may also use programming from sources such as YouTube or other online services. Specific YouTube programs may be located by the user from a search window. Other YouTube programs may be provided to the user by friends, such as via contacts in the social networking area 117 who may send a link or URL for a specific YouTube video. Such YouTube or other non-TV programming can be used to fill in the empty slots in a user's personalized channel 128. Such filling may also occur automatically by the system, such as by selecting videos that contain keywords or comments that match content associated with television programs that are already in personalized channel 128. The program guide system 100 may also add to the personalized channel 128 by using other programs that the user has watched or has scheduled. YouTube or other such programming may be directed at a user based on the user's user profile. Such a profile may indicate the user's age, gender, media interests, hobbies, marital status, religion, health, etc.

Certain selections, such as clicking on a cell 130 for a particular program, may cause a details page (see FIG. 1D) to be displayed. The details page 106 includes a program details area 132. The program details area 132 presents detailed information regarding the program, such as a genre of the program, a runtime length of the program, names of performers in the program, a content rating of the program, a quality rating of the program, and a synopsis of the program. The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user. The details page 106 also includes an image details area 140. The image details area 140 presents images associated with the program, such as image result 140*a*. The image result 140*a* may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a reviews area 142. The reviews area 142 may present reviews collected from the user's friends, friends of friends, and networking groups to which the user belongs. The reviews area 142 may be constructed by identifying all reviews for a particular program and then filtering such reviews by a list of members in a user's social network, so that only reviews from the social network are displayed.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a One Box. Selecting a program in the list 110 directs the user to the landing page 104. Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a media symbol and description 123 adjacent to a particular contact. For example, by selecting the media symbol and description 123a for the contact Tim, the schedule grid 120 may automatically display or highlight the corresponding portion of the schedule grid 120. In particular, Tim's channel 125a may become displayed (e.g., if hidden or scrolled off the screen) or enhanced in some way (e.g., by colors or shading). Similarly, selecting a particular episode in a program grouping may direct the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner. In addition, information may be acquired from a ratings and comments database, and a user can leave ratings or comments that will be added to the database. The user may view images related to the program in the image details area 140.

Referring again to FIG. 1B, the user may change the displays of the social networking area 117 and the schedule grid 120 in various ways. For example, the user may add other contacts to the social networking area 117, such as by selecting controls (now shown) to initiate a conversation with a new contact. Similarly, new contacts may appear in the social networking area 117 if they initiated the communication. When such communication starts, the new contact's media programming selections can be added as a row in the schedule grid 120. Similarly, as the user ends a communication with a particular contact, the schedule grid 120 may be changed or reduced, such as by the elimination of the channel representing that particular contact's media selections.

The user may also click on a particular entry in the schedule grid 120, and doing so may have several results (in addition, for example, to permitting the user to watch that show). For example, the user's social networking area 117 may be updated (e.g., by shading) to indicate the contacts that are currently enjoying that show or may be in the near future. At the same time, the social networking areas 117 of other contacts may be updated to indicate what the user is watching.

If the user clicks on a particular media symbol and description 123 displayed for a particular contact, the corresponding television show may pop up on the screen. The screen may also include instant messaging features by which the user may communicate to others who are watching the show. For example, contact Tim may be watching "24," as indicated in cell 166c in the schedule grid 120 and by the media symbol and description 123a. By clicking on the media symbol and description 123a, the user can immediately join the same show as Tim and communicate with Tim (and perhaps others who are watching the same show) in an instant messaging window, such as that depicted in FIG. 1C.

The schedule grid 120 presents the programs matching the search term as well as other programs occurring around the time of the matching program. Selecting a particular media symbol and description 123 in the social networking area 117 can also move the schedule grid 120 up or down to a channel associated with the program, and left or right to a time associated with the program. This positions the view to the program instance in the schedule grid 120. The schedule grid 120 may immediately present the selected program positioned properly in the grid or may gradually present the program, such as by slowly scrolling to the grid location of the program.

Programs in the schedule grid 120 that also appear in the user's personal channel 128 or the channels of other contacts can be highlighted by color or shading. For example, "24" cells 166a, 166c and 166d have one type of highlighting, while "Tonight Show" cells 130 and 166e have another type of highlighting, and so on. The highlighting may be, for example, a shading, color, grid cell size, or cell border thickness that differentiates the schedule grid programs. In certain implementations, the shading, coloring, or sizing varies based on, for example, the number of contacts (including the user) that have selected the program or by popularity information associated with the program (such as television ratings information, internet click data, or information reflected the change in either). One manner in which such popularity may be shown is by relative colors of the cells in a grid, similar to the display of a thermal map, with colors ranging steadily from blue (least popular) to red (most popular), or another appropriate color scheme.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 also has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

FIG. 1C shows a screen shot 133 of a playing program combined with a chat session and on-screen promotion. In particular, the screen shot 133 shows one example of a display in which the user's friend Tim is promoting the show using instant messaging. The display may occur, for example, if the user selects media symbol and description 123a in the social networking area 117 (e.g., a messaging window) of FIG. 1B for a friend (e.g., Tim) that is watching a television program. In particular, the television program pops up on the user's screen, as does a chat session window 135 where the user and their friend can type comments back and forth, such as making jokes or other comments about the program as it runs. Such a chat session can include other friends which the user may select from a list of contacts 137.

In some implementations, selection of one of the media symbols for a contact in the list of contacts 137 may cause the screen to split, allowing the user to watch two shows at once. The list of contacts 137 may also include the names of groups by which the user can automatically begin messaging with multiple friends in a particular group. In this way, multiple people watching the same show may see the same funny or clever comments that can occur in real-time during the show. In some implementations, the program guide system 100 may include a feature by which the stream of comments received from multiple users can be saved for future reference, such as posted to a social networking site under, for example, a media comments tab. Also, users may subscribe to a group and comments form one group leader may be displayed, to provide an experience like the program Mystery Science Theatre 3000, where certain viewers of a program watched bad movies and provided clever quips during the showing of the movie.

Functionality for the list of contacts 137 may be like that discussed above for the social networking area 117. In particular, contacts in a user's social network may appear when they become accessible for communications, and may also be shown with media-related information if that are watching or listening to such information. A user may then choose to chat with them, such as if the user has access to a keyboard. In addition, the user may select a channel associated with one of the contacts and may have his or her channel changed to that other channel. In addition, the chat session window 135 may switch to a chat session for the other users in the social network who are now watching or listening to the newly displayed program.

FIG. 1D shows an example screen shot 106 of a media details page. As previously described, the details page 106 includes the program details area 132, the image details area 140, and a reviews area 142. The user can use the reviews area 142 to see reviews and ratings from people in their social circle, and to provide reviews that can in turn be viewed by users in their social circle.

The program details area 132 shows a list 160 of actors associated with the presented program. A user may select an actor in the list 160, for example, to initiate a search of media programming for the selected actor. The search may direct the user to the landing page 104. Alternatively, such a selection may obtain a details page associated with the actor, such as from the iMDB web site. Similar actions may be taken with respect to directors, producers and/or others who might be associated with a program.

The program details area 132 includes actions 162a-c (e.g., record to TiVo, send as email, etc.) that may be performed using the program. The program details area 132 also includes information 166 associated with the program, such as an image from the program, the name of the series or program, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, such as a structured collection of images, using the search term or other information associated with the program. A user may select one of the images 140a-d and be directed to a web page where the image may be found.

The reviews area 142 presents review information gathered from people who have commented on the show identified in the program details area 132. The reviews, or some of the reviews, may also be associated with a particular episode of a program. Such reviews may come from the user's friends, friends of friends, or anyone in various social networking groups that may collect reviews for specific shows. A user may also expand the scope of users whose reviews will be displayed, such as to include users having a "reviewer rating" that is above a certain quality level, or to view all reviews.

As depicted in FIG. 1D, no reviews exist from friends 142a, but five reviews exist from friends of friends 142b. Group reviews 142c and 142d represent ratings compiled by several members of their respective groups, such as online groups that the user has joined. For example, the group review 142c can represent the combined ratings from members of a "24" Conspiracy group, with the summarized rating indicated by a graphic of four out of five filled-in stars 147c. The reviews from members of a Big Chain Society group 142d may indicate a lower popularity, as indicated by three out of five filled-in stars 147d. The combined review for the user's friends of friends 142b also shows four out of five filled-in stars 147b.

The user may see individual reviews in different ways. For example, the user may click on expansion symbols 145 to expose or hide individual reviews. In particular, if an expansion symbol 145 is a plus sign, clicking on the expansion symbol 145 can result in the individual reviews of members of that group to be displayed below the group name. Subsequently clicking on an expansion symbol 145 that is a minus sign can hide the individual reviews. As depicted, individual reviews 149 are expanded under the friends of friends group review 142b. Each of the individual reviews 149 lists the reviewer's name (e.g., Karen, Nicole B, Betty, Carla P, Doris) and a short comment. In some implementations, the individual reviewer's name can be an underlined hyperlink (as indicated using underlining) allowing the user to click on the link and see more information about the reviewers' reviews. For example, clicking on the link may allow the user to see reviews of other programs rated by the reviewer or additional information about the proximate review (e.g., a numeric score or a long comment). In this way, the user can see reviews by their friends or by members in a social networking group (e.g., 24 Conspiracy group).

Other examples of the types of people who may be in social networking groups are car enthusiasts, scrapbookers, woodworkers, base jumpers, storm chasers, hobbyists, collectors, marathoners and fantasy football fanatics, to name a few examples.

Figure 2A:
FIG. 2A shows an example screen shot of social status indicators superimposed over a playing program.

FIG. 2A shows an example screen shot 202 of social status indicators superimposed over a playing program. The screen shot 202 shows a scene from a gardening show that may be watched simultaneously, for example, by members of a gardening group. At the same time, the gardening enthusiasts may be in communication, such as in an instant messaging window 204. Other social networking or communication scenarios may include video conferencing, or the sharing of video or photos (e.g., via Rosetta or other sharing programs). The instant messaging window 204 shows the user in conversation with Mary, who is also enjoying the show. The user and Mary can be sharing real-time comments on the show (and/or gardening in general) while the show progresses.

Mary may be one of several contacts with whom the user may communicate during the show. For example, the contacts window 206 may include Mary and several other contacts that may be watching television or enjoying some other media programming. The particular media type being enjoyed by a contact may be depicted by some sort of a symbol, such as the outline of a TV, radio or stereo. Additional detail about the contact's current viewing may be shown also, or may be shown upon a particular action occurring such as a user floating over one of the symbols. Selections may be made, in this example, using a remote control, such as by raising the pop-up window by a form of "menu" button, and navigating through the selections using the 4-way navigation button that is common on remote controls. The contacts window 206 may be limited to contacts that are actually experiencing media at the moment, such as watching TV, listening to Internet radio, or listening to their own files (e.g., MP3 music or podcasts or the like).

The screen 202 may also be split, so that the user can multi-task, such as by watching the gardening show and listening to music simultaneously (and, e.g., undergoing a chat session with one of the groups of contacts). Additional controls may exist in the screen 202 for controlling the audio and visual components of multiple media programming running at the same time. In this way, users and their contacts can also share home music and other local content over the network.

Figure 2B:
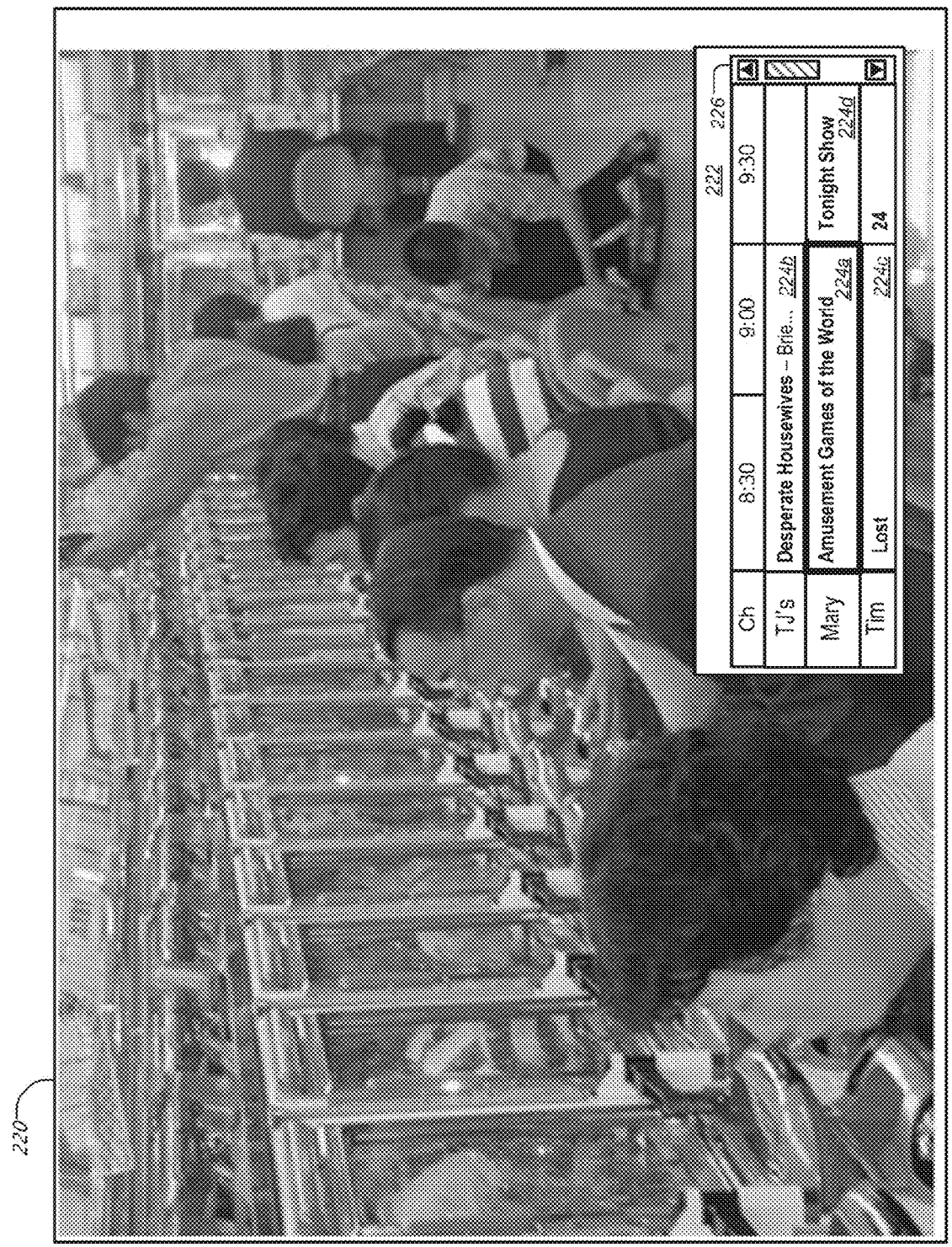
FIG. 2B shows an example screen shot of a social program guide superimposed over a playing program.

FIG. 2B shows an example screen shot 220 of a social program guide superimposed over a playing program. In general, the screen shot 220 may incorporate the personalized channels portion (or other channels) of the program guide 120 from FIG. 1B into a mini program guide to be displayed over a playing program. In this manner, a user may use the system, for example, to jump between the personalized channels of the user's contacts as well as the user's personalized channel 128 (e.g., My TV). The guide may be organized, for example, with the user's personal channel on top, followed by the user's contacts, and continuing with standard network and cable channels, where the user may scroll vertically through the various channels.

For example, the screen 220 includes a program guide grid 222 that currently displays media programming for the user's contacts (e.g., TJ, Mary and Tim). The screen 220 is showing the television program corresponding to Mary's highlighted cell 224a, which the user has previously selected. The user may jump to other contacts' shows or Mary's other shows by selecting other cells 224b-d in the program guide grid 222. For example, the user may begin watching Tim's current show Lost by selecting cell 224c, or TJ's Desperate Housewives by selecting cell 224b. The user may also select cell 224d, for example, to obtain information about Mary's scheduled showing of the Tonight Show in the next time slot.

The user may watch programs synchronously (i.e., where the users see the same content nearly simultaneously) with other users or asynchronously. Where the viewing is asynchronous but the user is only slightly behind the viewing of the selected contact, the user may be shown an interface (e.g., a representation of one bar behind another, where the relative location of the bars represents the relative time for each user in a program) and may be able to fast-forward through certain portions of a program in order to catch up with their contact. The contact may also be notified if a friend is watching the same program, along with an interface showing the relative positions of the users in the program. The contact may thus choose to pause their program and do something else until their friend catches up, and the two may then conduct communications while watching the program in synchronicity.

The user may navigate the program guide grid 222 in different ways. For example, the user may use a scroll bar 226 to move up and down within the program guide grid 222. The user may also use arrows or other such buttons on a remote control or computer keyboard to navigate in up/down and left/right directions. The user may also simply use a mouse to select a desired cell 224a-d in the program guide grid 222. By selecting a particular cell, for example a television program being watched by the user's friends TJ, Mary or Tim, the television's tuner can automatically switch to that displaying that program.

Figure 2C:
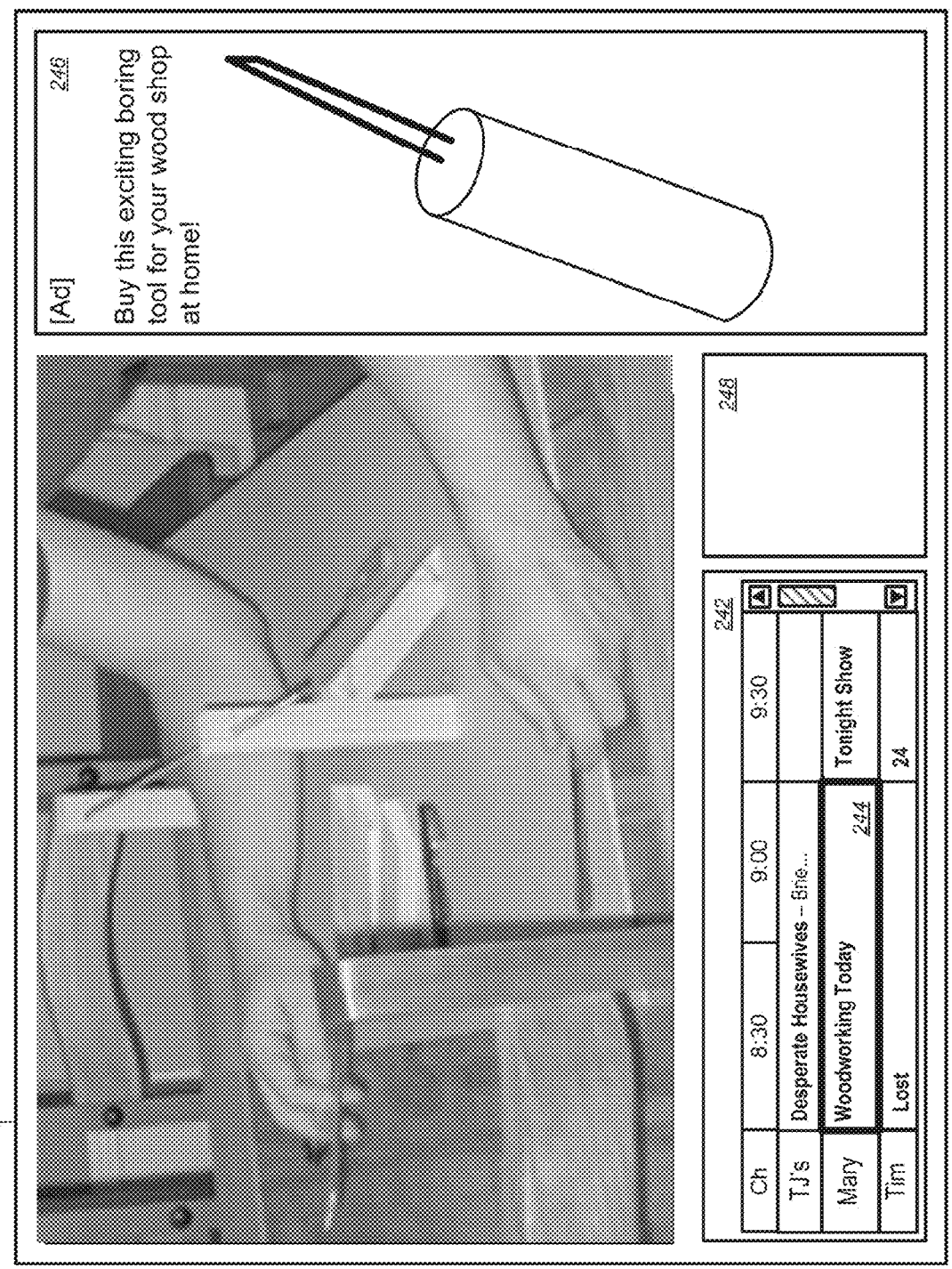
FIG. 2C shows an example screen shot of a social program guide and ads with a playing program.

FIG. 2C shows an example screen shot 240 of a social program guide and ads with a playing program. In general, this screen shot 240 is similar to the screen shot 220 of FIG. 2B, but instead involves a shrunken video program that makes room for a program guide and an advertisement, rather than a program guide overlaid on a playing program.

The display includes a program guide grid 242 that contains cell 244 corresponding to the Woodworking Today show currently showing. The screen 240 also includes an ad area 246. The ad displayed in the ad area 246 may be specifically targeted to the user. For example, if the user is watching the television program Woodworking Today, the ad can feature some kind of a woodworker's tool, such as a wood boring tool. The targeting of the ad may be automatic, such as by matching the ad to the genre of the television program. The ad may also be targeted to the user based on information in the user's user profile which may, for example, identify the user as having woodworking as a hobby. The ad may also be targeted to a common interest shared by the users of friends or to a group to which the user belongs.

Other ads may appear in ad area 248, and such ads may be selectable by the user. For example, while the ad area 246 may contain permanent ads, the ads in ad area 248 may be turned on and off by the user. Ads in ad areas 246 and 248 may generate revenue that effectively support the program being shown, which may eliminate the need for commercial breaks. Playing of ads in ad areas 246 and 248 may permit a user to avoid ads that interrupt the playing of a program, such as classic 30-second television commercials.

Some ads displayed in ad areas 246 and 248 may be, for example, "2 for 1" or referral ads targeted to the user and the user's contacts. For instance, users may be given credits of some sort if they make a recommendation to someone in their social circle who then acts on the recommendation, such as by buying a specific product corresponding to the ad.

Figure 3:
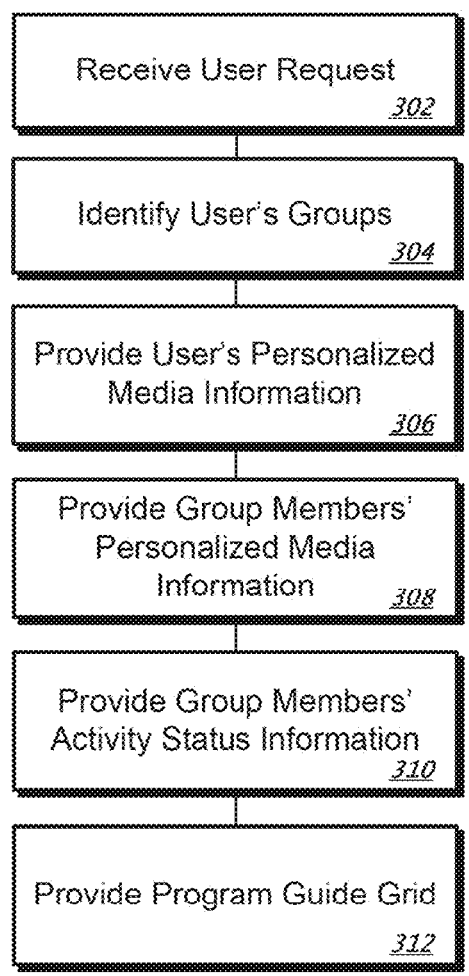
FIG. 3 is a flowchart of an example process for providing social media programming information to a user.

FIG. 3 is a flowchart of an example process 300 for providing social media programming information to a user. Generally, the process 300 is a process by which a program guide grid provided to the user is enhanced with social networking information.

At box 302, the system receives a user request for a program guide grid. For example, referring to FIG. 1B, the user can request to display the program guide grid 120. In some cases, the program guide grid 120 may appear automatically when the user picks up the remote, turns on television programming, or begins communications with one or more social contacts, such as in an instant messaging system.

At box 304, the user's groups are identified. For example, the program guide system 100 may access the user's user profile on a local computer, or access a personal profile showing friends or (by extension) friends-of-friends information stored at a social networking site such as FACEBOOK or ORKUT. The result can be a list of users that represent the user's circle of friends. For example, the list may include the names of contacts such as Tim, Mary, Adam and TJ corresponding to contacts that may be displayed in the social networking area 117. The list may also include social networking groups to which the user belongs, such as gardening or woodworking groups.

At box 306, the user's personalized media information is provided. For example, the user's personalized media information may include the media programming information corresponding to the user's personalized channel 128 (e.g., "My TV") for a relevant programming time period.

At box 308, the group members' personalized media information is provided. For example, the group members' personalized media information can be for the user's friends (e.g., Tim, Mary, etc.) and may include part or all of their selected programs. For instance, such programs for the user's friend Tim can correspond to the row for Tim's channel 125a in the program guide grid 120.

At box 310, the group members' activity status information is provided. For example, some of the user's contacts may be online and actively consuming media programming. Indicators 121 may indicate particular contacts' availability using different colors or shading.

At box 312, the program guide grid is provided. For example, the program guide grid 120 may appear on the user's screen with all of its components. Specifically, the components can include the user's personalized channel 128 (e.g., "My TV"), contacts' personalized channels (e.g., Tim's channel 125a and the channels of other contacts), and standard network and cable channels. In addition to displaying the program guide grid 120, the program guide system 100 can display an interface like the social networking area 117 of FIG. 1B, by which the user can interact with others (e.g., by instant messaging) who may be enjoying similar (or different) media programming.

Figure 4A:
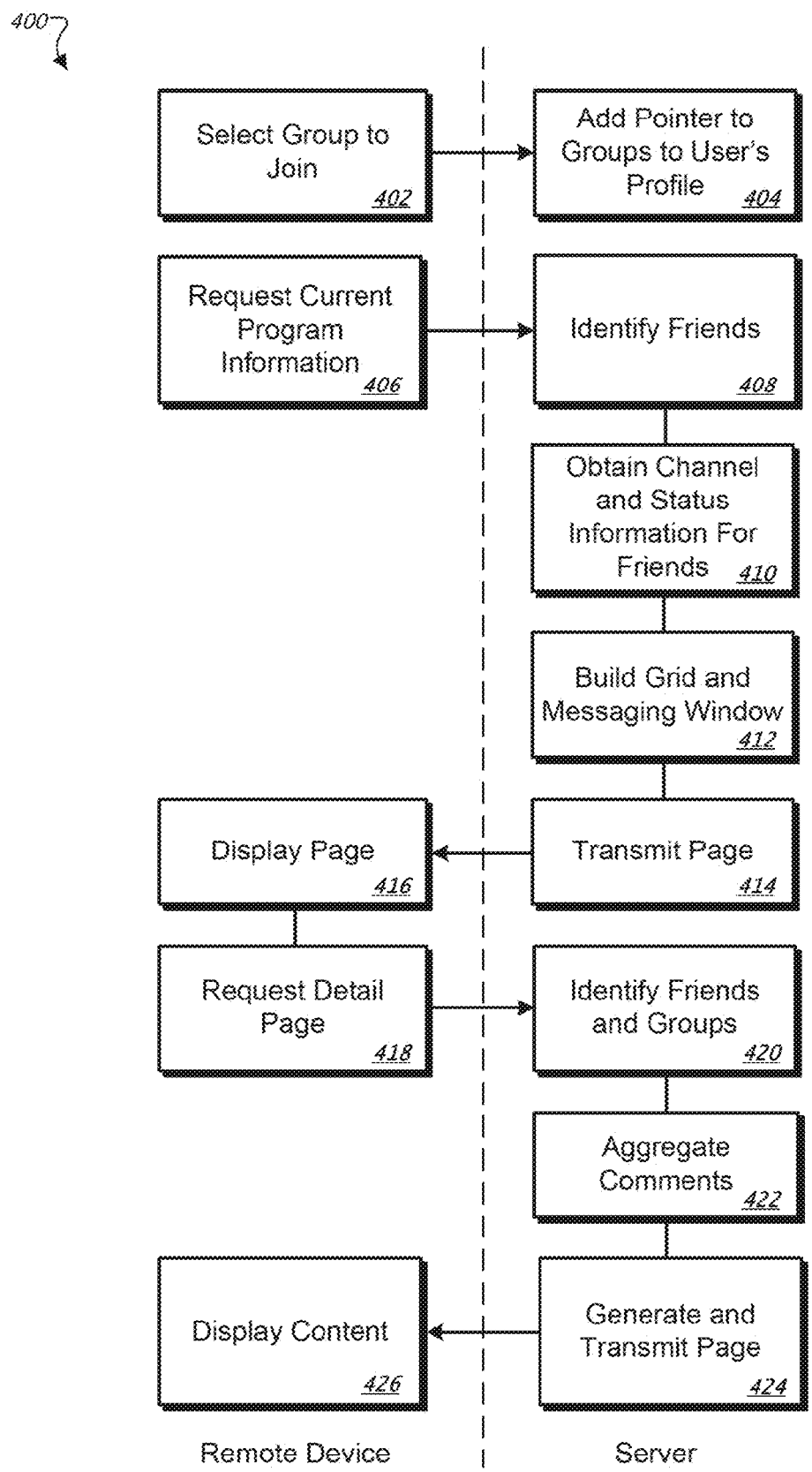
FIGS. 4A and 4B are swim-lane diagrams showing a process for providing social media programming information in response to a user request.
Figure 4B:
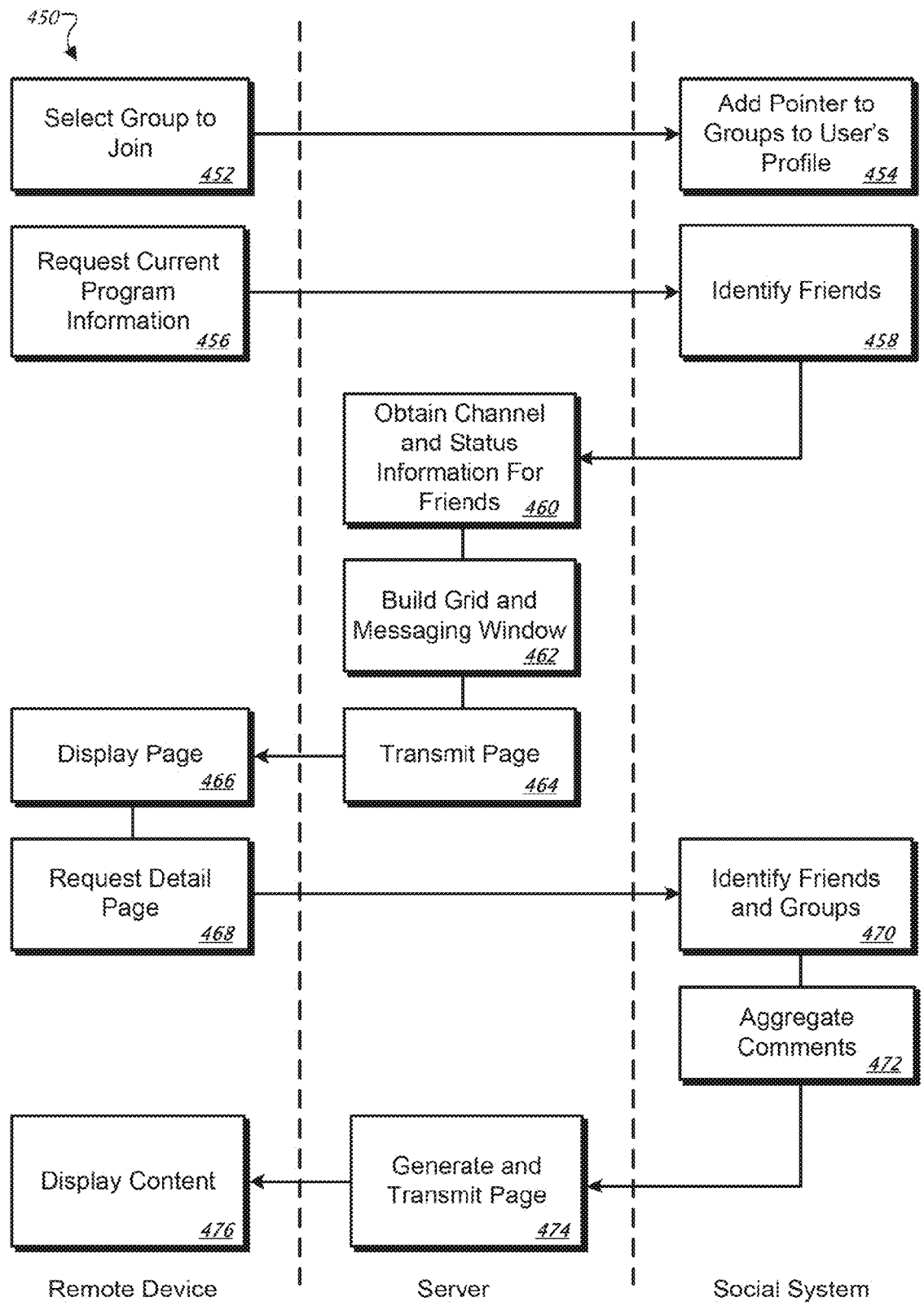

FIGS. 4A and 4B are swim-lane diagrams showing processes 400 and 450 for providing social media programming information in response to a user request. In FIG. 4A, steps in the process 400 are divided between a remote device and a server. By contrast, steps in the process 450 of FIG. 4B are divided among a remote device, a server, and a dedicated social system.

Referring to FIG. 4A, at box 402, the user selects a group to join. The group may be, for example, a gardening group or a woodworking group. The request may originate on the user's remote device, such as though a social networking site accepting new group members.

At box 404, the user's profile is updated to add the pointer to the new group. For example, if the user is joining a "24" Conspiracy group, that group name can be added to groups already defined for the user (e.g., woodworking, gardening, etc.)

At box 406, current program information is requested. The request can be, for example, a request to display the program guide grid 120 on the user's screen. Such request can originate from the user's remote device, such as while the user is watching television. At box 408, the user's friend's are identified. For example, the system may use the user's locally-stored profile or friends-of-friends information accessible from a social networking site such as Facebook or Orkut. At box 410, channel and status information for the user's friends is obtained. For example, the system may access the media programming information for the user's contacts, such as a list of contacts that may include those listed in the social networking area 117. The system can also determine the availability and status of the contacts, such as who may be online, what media they are enjoying, etc.

At box 412, the system builds the grid and messaging window. For example, the system can build the program guide grid 120 and the social networking area 117 as shown in FIG. 1B. The program guide grid 120 can include the user's personalized channel information, the personalized channels of contacts, and information for standard network and other channels (e.g., cable, satellite, etc.). In addition, in the area of the grid showing broadcast channels, any channels being viewed or scheduled to be viewed by members of a user's social circle may be highlighted or colored in a particular manner. Selecting such cells, such as by right-clicking on them, may cause information to be displayed that provides additional detail about the contact who is watching or has scheduled the program.

At box 414, the page containing the grid and messaging window is transmitted. For example, the page may be transmitted from the server to the remote device, such as using HTML, XML, or other appropriate mechanisms. At box 416, the page is displayed on the client device. For example, the page may be used to update the user's screen to include the program guide grid 120 and the social networking area 117. The entries in each may be connected logically by the contacts' names.

At box 418, a detail page is requested. For example, the request may originate when the user selects a particular television show to watch or requests information about a show in the program guide grid 120. At box 420, friends and groups associated with the program are identified. For example, the server may generate a list of the user's contacts that have also scheduled the program or may be watching it. The server may also identify groups that are associated with the program and/or user. For example, if the user is watching a gardening show, the server can identify gardening-related social groups to which the user belongs and/or contacts of the user who may share an interest in gardening.

At box 422, comments are aggregated. For example, the comments may be in the form of communications in one or more instant messaging sessions (e.g., displayed in the social networking area 117 or instant messaging window 204) associated with users watching the same television show. In another example, the aggregation can be in the form of group ratings or reviews (e.g., in the reviews area 142 of FIG. 1D).

At box 424, the page is generated and transmitted. For instance, the page may contain instant messaging communications for the user and one or more of the user's contacts for display in social networking areas 117 or instant messaging windows 204. In another example, the page may contain review information to be displayed in the reviews area 142 of FIG. 1D.

At box 426, content is displayed. For example, the content may be individuals' comments about shows, videos or songs displayed in a social networking area like area 117 in FIG. 1B or instant messaging windows 204 in FIG. 2A on users' remote devices, or they may be ratings or reviews displayed in reviews area 142.

Referring again to FIG. 4B, the process 450 is similar to the process 400. However, the process 450 uses a dedicated social network system to provide information about social connections between users. Some steps otherwise performed by the server in process 400 are instead performed by the social server in process 450. For example, the server in process 450 may simply access the social network system for selected functionality. In this way, all sorts of applications involving users and media programming, etc., can hook into a social network server to get social data and then pull that data back and use it to deliver better targeted services. In particular, the applications can add the social networking aspect to existing applications, making the applications more enjoyable among mutual friends.

At box 452, the user selects a group to join. The group may be, for example, a gardening group or a woodworking group. The request may originate on the user's remote device, such as though a social networking site accepting new group members. In process 450, this request can be sent from the user's remote device to the dedicated social system. The selection by the user may also occur in other ways, such as by a selection at a site that is separate from the social networking site, such as at a television network site that leads social groups to direct them toward particular programming and discussion topics. At box 454, the user's profile is updated to add the pointer to the new group. For example, if the user is joining a "24" Conspiracy group, that group name can be added to groups already defined for the user (e.g., woodworking, gardening, etc.)

At box 456, current program information is requested. The request can be, for example, a request to display the program guide grid 120 on the user's screen. Such request can originate from the user's remote device, such as while the user is watching television. In process 450, this request can be sent from the user's remote device to the dedicated social system.

At box 458, the user's friend's are identified. For example, the system may use the user's locally-stored profile or friends-of-friends information accessible from a social networking site such as Facebook. In process 450, this identification can occur directly on the social networking site, and the results transmitted to the server.

At box 460, channel and status information for the user's friends is obtained. For example, the system may access the media programming information for the user's contacts, such as a list of contacts that may include those listed in the social networking area 117. The system can also determine the availability and status of the contacts, such as who may be online, what media they are enjoying, etc.

At box 462, the system builds the grid and messaging window. For example, the system can build the program guide grid 120 and the social networking area 117. The program guide grid 120 can include the user's personalized channel information, the personalized channels of contacts, and information for standard network and other channels (e.g., cable, satellite, etc.).

At box 464, the page containing the grid and messaging window is transmitted. For example, the page may be transmitted from the server to the remote device. At box 466, the page is displayed. For example, the page may be used to update the user's screen to include the program guide grid 120 and the social networking area 117. The entries in each may be connected logically by the contacts' names.

At box 468, a detail page is requested. For example, the request may originate when the user selects a particular television show to watch or requests information about a show in the program guide grid 120. In process 450, this request can be sent from the user's remote device to the dedicated social system.

At box 470, friends and groups associated with the program are identified. In process 450, this identification can occur on the dedicated social system. For example, the social system (e.g., Facebook) may generate a list of the user's contacts that have also scheduled the program or may be watching it. The social system may also identify groups that are associated with the program and/or user. For example, if the user is watching a gardening show, the social system can identify gardening-related social groups to which the user belongs and/or contacts of the user who may share an interest in gardening.

At box 472, comments are aggregated. In process 450, this aggregation can occur on the dedicated social system. For example, the comments may be in the form of communications in one or more instant messaging sessions (e.g., displayed in the social networking area 117 or instant messaging window 204) associated with users watching the same television show. In another example, the aggregation can be in the form of group ratings or reviews (e.g., in the reviews area 142 of FIG. 1D).

At box 474, the page is generated and transmitted. For instance, the page may contain instant messaging communications for the user and one or more of the user's contacts for display in social networking areas 117 or instant messaging windows 204. In another example, the page may contain review information to be displayed in the reviews area 142 of FIG. 1D.

At box 476, content is displayed. For example, the content may be individuals' comments about shows, videos or songs displayed in social networking areas 117 or instant messaging windows 204 on users' remote devices, or they may be ratings or reviews displayed in reviews area 142.

Figure 5:
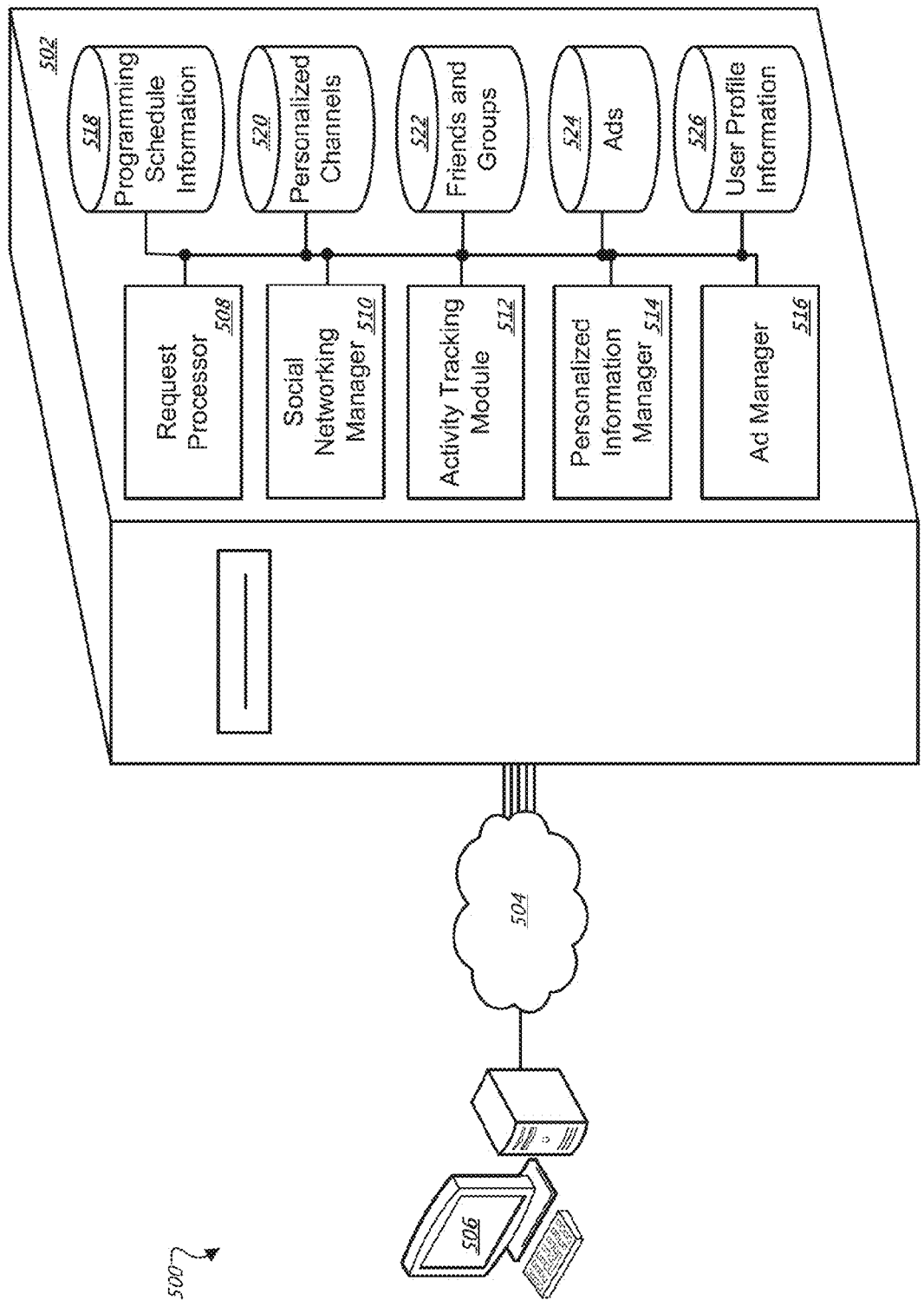
FIG. 5 is a schematic diagram of a system for providing personalized media information.

FIG. 5 is a schematic diagram of a system 500 for providing personalized media information. The system 500 includes a client 506, a media server 502, and a network 504, such as the Internet, connecting the two. The media server 502 may communicate through an interface, which may itself include or be part of one or more web servers. Functionality described herein as provided by the media server 502 may be provided in part by the client 506, and may be provided by any appropriate combination of between one and a large number of computers.

Media-related requests from the client 506 may be identified by the interface in the media server 502 and routed to the request processor 508. The request processor 508 may parse the requests into their constituent parts to determine the sort of information requested by the client 506. For example, if the request is for media programming and related social networking information, the request processor 508 may provide a program guide grid and an instant messaging window that are responsive to the request.

The media server 502 includes a social networking manager 510. When the user's action results in a communication with (or demands information from) other users, such as interfacing with the social networking area 117 (see FIG. 1B), the social networking manager 510 can provide the information needed for communication. Such information can include the user's contacts, their availability, and the media programming they are enjoying. The information can also support the real-time communication during the programming, such as in an instant messaging or video conferencing window. As such, the social networking manager 510 may include one or more messaging applications. The social networking manager 510 may also provide the information (e.g., rankings and comments) used in the reviews area 142 (see FIG. 1D).

An activity tracking module 512 can follow the user's activity as well as the activity of the user's friends or groups. For example, the activity tracking module 512 can determine when the user selects a media symbol and description 123 (FIG. 1B) adjacent to a particular contact in order to begin watching that contact's show. In another example, the activity tracking module 512 can intercept the user's inputs, such as text the user enters in a chat message area or selections the user makes from a programming guide grid. The activity tracking module 512 may also handle information received regarding the activities of the user's contacts, such as the clients' communications with the user.

A personalized information manager 514 can handle the personalized channel information of the user and provide information regarding the personalized channels of the user's contacts. For example, the personalized information manager 514 may allow the user to update and access the personalized channel (e.g., My TV). In another example, the personalized information manager 514 can provide the user with the personalized channel information for the user's contacts. As such, this type of information may be displayed in the programming guide grid in a row such as Tim's channel 125a in FIG. 1B.

An ad manager 516 can manage ads displayed during media programming. For example, referring to FIG. 2C, the ad manager 516 may provide the ad 246 for the exciting wood-boring tool. The ad manager 516 may also handle ads for the ad area 248. Ads handled by the ad manager 516 may, for example, use profile information stored for the user.

Various databases 518-526 may be accessed and updated by system 500. For example, the programming schedule information database 518 may contain standard program schedule information, such as that available from networks, cable stations, satellite stations, various commercial providers, etc. The data may be accessed, for example, in response to requests from JavaScript running on the client, and may be supplied via XML or other format for use in an asynchronous fashion. Also, schedule information 518 may be provided, such as to the request processor 508, for building the program guide grid to display programming information.

The personalized channels database 520 may contain personalized information about users. Such information may include, for example, favorite channels of the user, the content of the user's personalized channel and other information that may be used to generate custom displays like those shown in FIGS. 1A-D and 2A-C.

The friends and groups database 522 can identify the user's friends, friends of friends, and social networking groups to which the user belongs. The information may be used, for example, to populate the contacts displayed in the social networking area 117, listing the user's friends or contacts that are currently available for instant messaging and the like. Friends and groups information can also be used to determine the reviews 142 displayed on the details page 106 (see FIG. 1D).

The ads database 524 can include ads that may be displayed in association with media programming. For example, information from the ads database 524 may be used to populate ad 246 and ads displayed in the ad area 248. The user profile information 526 can identify a user's age, gender, media interests, hobbies, marital status, religion, health, etc., where the user has chosen to provide such information. The ad manager 516 may use this information, for example, to target specific ads to a user based on information stored in the user's profile. Such user profile information can be maintained by one or more social networking sites and may include information provided by the user (e.g., during registration at the site) and information obtained by the user's online actions (e.g., search queries entered, web sites visited, media programming selected, etc.). Data in the various databases 518-526 may be stored in a distributed way, such as in whole or in part on the media server 502, the client 506, and on various web sites and social networking sites.

Figure 6:
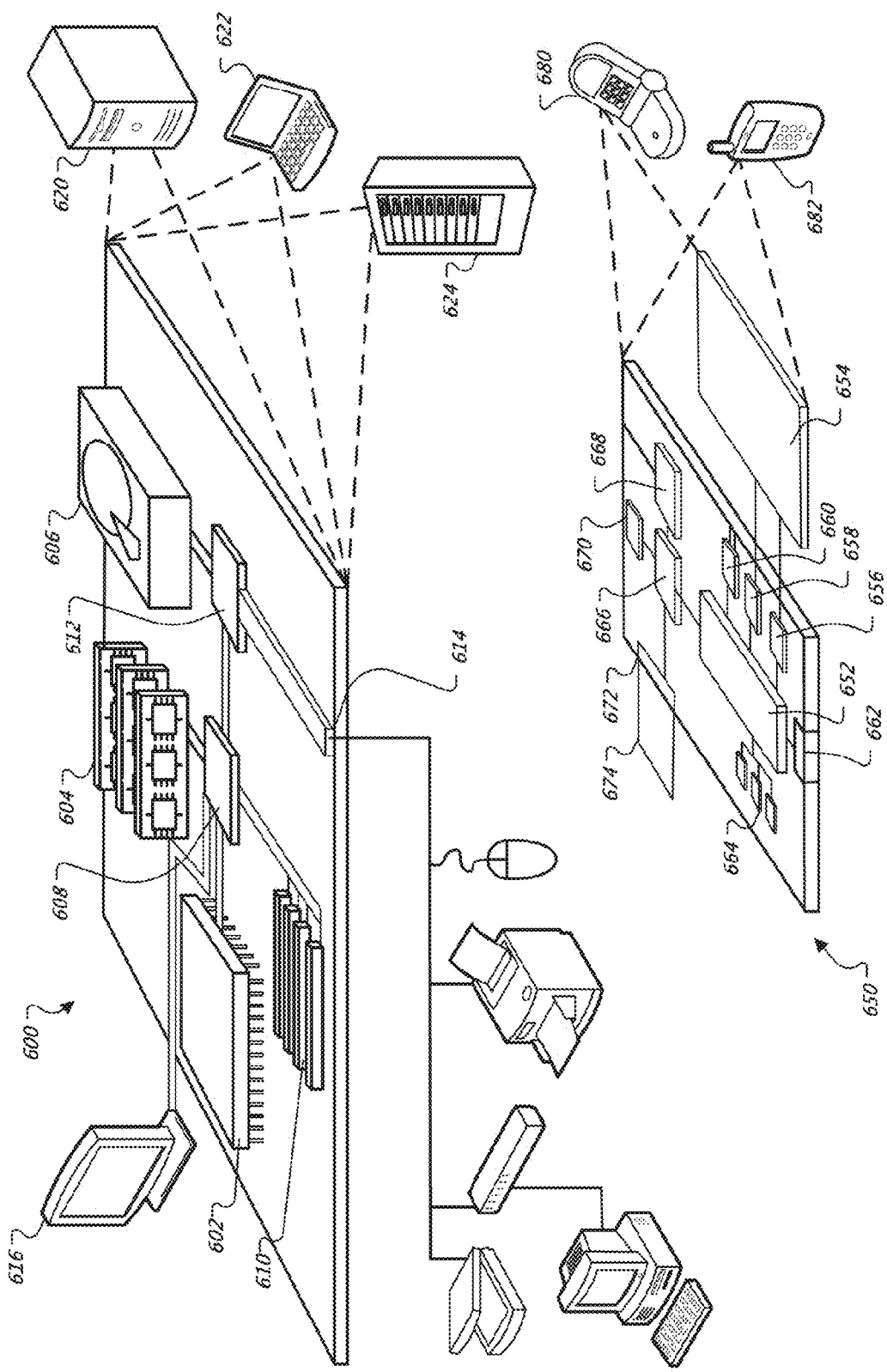
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, objects to share with friends or groups may be used to access in a variety of manners, and particular ways of displaying such information may vary from the specific examples shown here. Accordingly, other embodiments are within the scope of the following claims.

What is claimed is:

1. A computer-implemented method, comprising
receiving information from a request from a user of a computing device to display, in an electronic program guide, descriptors of media programming content for a time period;
identifying people associated with the user, the identifying using predefined acquaintance relationships between users that are stored in a computer database of a central computer system in an account for the user, and identifying time-associated media programs scheduled for the identified people;
determining which of the identified people are currently available for contact by the user through the central computer system and are accessing media content; and
providing, for display to the user, descriptions of the identified people and of the time-associated media programs that are scheduled for the identified people, and adjusting the time-associated media programs that are displayed to the user in the electronic program guide based on determinations of which people associated with the user are currently available for contact by the user.

2. The method of claim 1, wherein the display comprises a presentation of status of the identified people including current media viewing or listening status.

3. The method of claim 2, further comprising receiving a selection of an indicator of current media viewing or listening status for a first identified person and producing a command for matching the user's viewing or listening status to the viewing or listening status for the first identified person.

4. The method of claim 2, wherein the presentation of status is visually superimposed on a playing media program.

5. The method of claim 1, wherein the display comprises a presentation of the electronic program guide containing personalized channels for one or more of the identified people.

6. The method of claim 5, wherein the personalized channels are displayed in combination with non-personalized broadcast channels in a grid.

7. The method of claim 5, further comprising receiving a request to copy a program from a personalized channel for a first identified person to a personalized channel for the user.

8. The method of claim 1, further comprising receiving a request identifying a selected media program and generating a document that includes comments on the selected media program from the identified people.

9. The method of claim 1, wherein the people are identified from a list of friends predetermined by the user.

10. The method of claim 9, further comprising querying a social networking server with an identifier for the user and obtaining in return the list of friends.

11. The method of claim 1, wherein the people are identified from a list of groups predetermined by the user.

12. The method of claim 1, further comprising receiving a request from the user to schedule a media program from one of the identified people, and providing a notice to the one of the identified people of the request.

13. The method of claim 1, further comprising coordinating communications between the user and one or more of the identified people while a common media program is played to the user and the one or more of the identified people.

14. A computer-implemented system, comprising:
an interface to receive requests for the provision of media programming content for a time period;
a processor programmed to identify individuals socially connected to a user by an acquaintance relationship reflected in a user account for the user; and
a grid generator to generate code for displaying media programming for the individuals for the time period, wherein the grid generator is programmed to show time-associated media programs, in a electronic program guide, that the individuals have previously scheduled to view, and where the grid generator is programmed to adjust media programming that is displayed in the electronic program guide based on determinations of which individuals are currently available for contact by the user.

15. The system of claim 14, wherein the processor is programmed to identify individuals socially connected to the user by submitted an identifier for the user to a general social networking system.

16. The system of claim 14, further comprising code for displaying the media programming presents current or scheduled programming for a plurality of identified individuals for display to the user.

17. The system of claim 14, wherein the grid generator is programmed to create a list of identified individuals currently receiving media programming.

18. The system of claim 14, wherein the grid generator is programmed to create a multi-dimensional grid showing personalized channels for the identified individuals.

19. The system of claim 14, further comprising a channel changing module to match a played media program for the user to a played media program from an identified individual that is selected by the user.

20. One or more non-transitory tangible computer-readable media staring instructions that, when executed by one or more processors, perform operations comprising:
- receiving information from a request from a user of a computing device to display, in an electronic program guide, descriptors of media programming content for a time period;
- identifying people associated with the user, the identifying using predefined acquaintance relationships between users that are stored in a computer database of a central computer system in an account for the user, and identifying time-associated media programs scheduled for the identified people; determining which of the identified people are currently available for contract by the user through the central computer system and are accessing media content; and
- providing, for display to the user, the descriptions of the identified people and of the time-associated media programs that are schedule for the identified people, and adjusting the time-associated media programs that are displayed, in the electronic program guide, based on determinations of which people associated with the user are currently available for contact by the user.

* * * * *